US009465658B1

(12) United States Patent
Shashi

(10) Patent No.: US 9,465,658 B1
(45) Date of Patent: Oct. 11, 2016

(54) TASK DISTRIBUTION OVER A HETEROGENEOUS ENVIRONMENT THROUGH TASK AND CONSUMER CATEGORIES

(71) Applicant: Amazon Technologies, Inc., Reno, NV (US)

(72) Inventor: Bhushan Chandramouli Shashi, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 14/227,835

(22) Filed: Mar. 27, 2014

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
None
See application file for complete search history.

(56) References Cited

U.S. PATENT DOCUMENTS

| | | | | |
|---|---|---|---|---|
| 6,996,821 B1* | 2/2006 | Butterworth | .......... | G06F 9/4881 711/100 |
| 7,093,004 B2* | 8/2006 | Bernardin | ............ | G06F 9/505 707/999.1 |
| 8,104,043 B2* | 1/2012 | Padisetty | ............ | G06F 9/5038 718/100 |
| 8,522,240 B1* | 8/2013 | Merwarth | .......... | G06Q 10/0631 705/26.82 |
| 2008/0155547 A1* | 6/2008 | Weber | .................. | G06Q 10/109 718/102 |
| 2012/0124126 A1* | 5/2012 | Alcazar | .................. | H04L 67/02 709/203 |

OTHER PUBLICATIONS

Wang et al., "Task Matching and Scheduling in Heterogeneous Computing Environments Using a Genetic-Algorithm-Based Approach," *Journal of Parallel and Distributed Computing*, vol. 47, (1997), pp. 8-22.

* cited by examiner

*Primary Examiner* — Gregory A Kessler
(74) *Attorney, Agent, or Firm* — Klarquist Sparkman, LLP

(57) ABSTRACT

Task distribution over a heterogeneous system is provided using task and consumer categories. A task category can be created for a task based on task attributes of the task. An entry in a data store can be identified by the task category. If an entry matching the task category is found, a task description can be stored in the matching entry. If an entry matching the task category is not found, a new entry in the data store can be created for the task category and the task description can be stored in the new entry. In addition, a consumer device can request a task description by a consumer category that is based on consumer attributes of the consumer device. If an entry matching the consumer category exists in the data store, a task description in the matching entry can be sent to the consumer device.

20 Claims, 12 Drawing Sheets

TASK DISTRIBUTION OVER A HETEROGENEOUS ENVIRONMENT THROUGH TASK AND CONSUMER CATEGORIES

BACKGROUND

Some organizations desire the ability to efficiently distribute tasks to consumers of those tasks. This allows an organization to quickly match the right task with the right consumer. With a limited number of tasks and consumers in a distribution environment, this may be accomplished relatively easily. However, as the number of tasks and consumers increases, distributing tasks becomes more and more difficult to achieve in an efficient manner.

For example, for a small number of tasks, distributing a task to a consumer of the task may be easily performed. An organization may look at the requirements for a task and match the task to a consumer that is most appropriate for that task. This may be repeated for all tasks, until all of tasks are distributed to consumers. However, for a large number of tasks and consumers, it may be inefficient to look at the requirements for each task and the capabilities of each consumer to match the tasks with the consumers. In addition, as tasks and consumers are added and removed, and the rate at which they are added or removed increases, the distribution environment needs the ability to handle the changing volume and speed of the task matching.

Compounding the problem is that there needs to be some sort of matching mechanism to match the tasks to the consumers. If the matching criteria do not change, then an organization only needs to resolve the above problem of scaling. However, where new matching criteria are required, the matching mechanism must also be able to handle these new criteria. This presents the problem of having to handle new criteria while matching a large number of tasks and consumers, which is not a trivial issue.

Therefore, there exists ample opportunity for improvement in technologies related to task distribution over a heterogeneous system.

DETAILED DESCRIPTION

Overview

Figure 1:
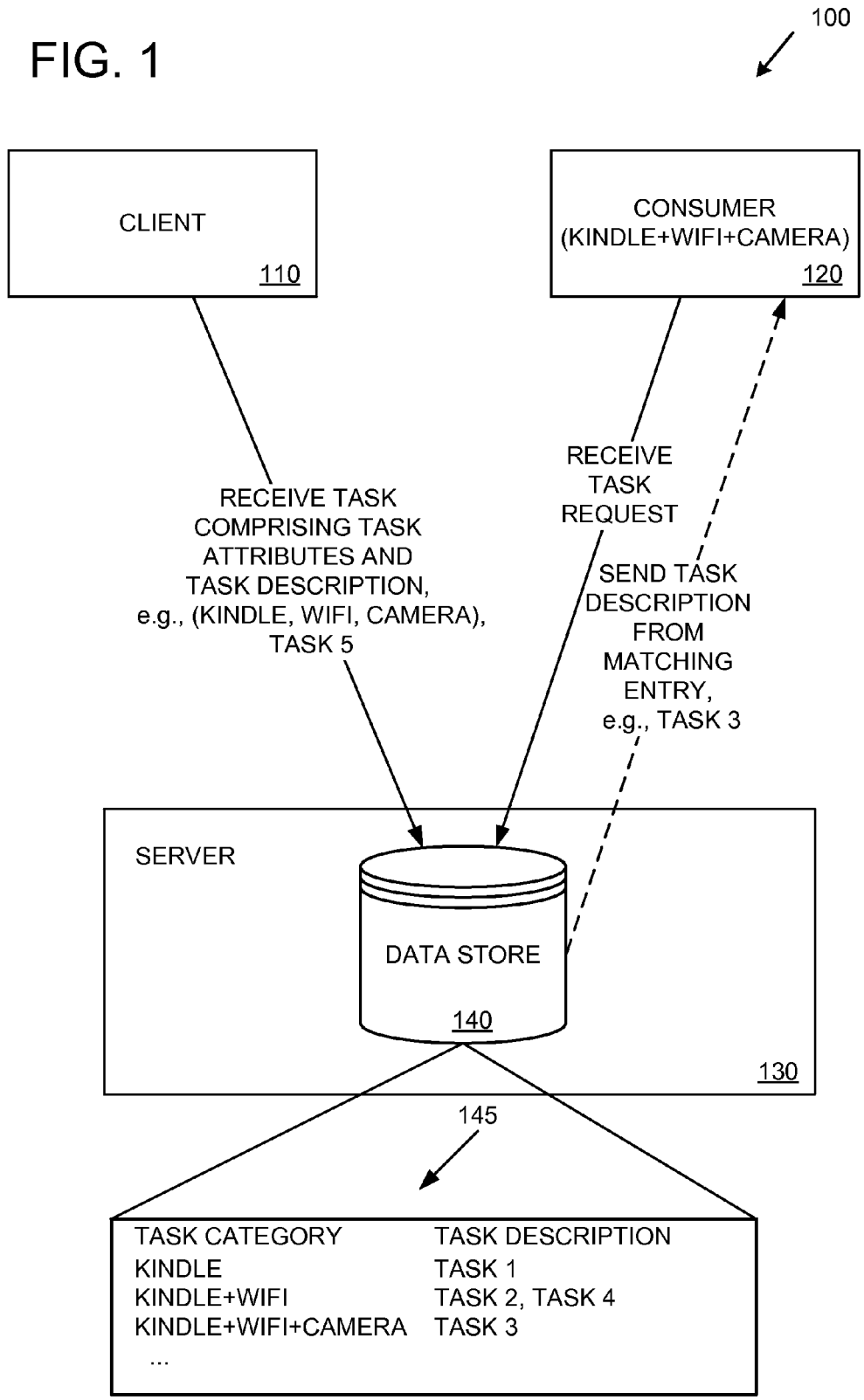
FIG. 1 is a diagram of an example environment supporting task distribution.

The following description is directed to techniques and solutions for distributing tasks (e.g., over a heterogeneous environment that comprises various types of computing devices that can communicate via one another, such as via the Internet) through task and consumer categories. The techniques and solutions can provide for matching tasks with specific attributes to consumer devices with corresponding attributes. For example, providing the ability to create and store attributes of tasks as they are required and allowing consumer devices to retrieve tasks based on these new attributes can be more efficient than having a set list of attributes that a task can require and updating the list of attributes as new attributes are identified. As used herein, the term "consumer device" refers to any type of computing device (e.g., a server computer, desktop computer, laptop, tablet, or another type of computing device) that is capable of receiving and executing tasks.

For example, attributes required for a task can be used to create a task category. The attributes of a consumer device can be used to create a consumer category. If a task category and consumer category match, the task can be distributed to the consumer device.

In some embodiments, a task can be received. A task category can be obtained for the task based on task attributes of the task and a task description can be stored in a data store using the task category as a key. If an entry in the data store is found for the task category, the task description can be stored in the entry matching the task category. If an entry is not found, a new entry can be created for the task category and the task description can be stored in the new entry.

In some embodiments, a consumer device can request a task based on a consumer category, the consumer category being based on consumer attributes of the consumer device. If an entry exists in the data store matching the consumer category, a task description in the matching entry can be sent to the consumer device.

For example, a client may have a task requiring an Amazon® Kindle® computing device with Wi-Fi capability and a camera. The client need only use the required attributes to create a task category for use in a data store. Once the task is stored in the data store, it may be distributed to a consumer device. A consumer device having the attributes of an Amazon® Kindle® computing device with Wi-Fi capability and a camera can retrieve this task, thus efficiently distributing the task to the consumer device.

Allowing the client to specify the attributes as needed may be more efficient that requiring the client to select from a set list of attributes, since new attributes may be required over time necessitating the set list of attributes to be continuously updated.

Hereinafter, the term "Kindle" may refer to an e-book reader or tablet computer marketed by Amazon as a Kindle or a device operating with the Amazon® Kindle® operating system. However, Kindle is not limited to the above descriptions and may also include, e.g., a device running an Amazon® Kindle® application or emulator.

Task Distribution Environment

In any of the embodiments described herein, a distribution environment can be provided for distributing tasks over a heterogeneous system. For example, the environment can comprise a server environment (e.g., a data store environment) for storing entries of tasks and responding to assignments and retrievals of tasks from the data store.

A heterogeneous system refers to a system that can support a broad range of devices. Thus, one client device need not be similar to another device. In addition, one consumer device need not be similar to another consumer device. This allows multiple device types to be supported in the distribution environment.

FIG. 1 is a diagram depicting an example environment 100 supporting task distribution. The example environment 100 comprises a server 130. The server 130 in turn comprises a data store 140 (e.g., databases and/or other storage repositories).

The data store 140 stores tasks. An example of entries of the data store 140 are shown at 145. For example, an entry can include a field storing a task category and a field storing task descriptions. The task category may be used as a key in the data store 140. In this example, the entry for the task category KINDLE has TASK 1 in the task description field.

The example environment 100 also comprises a client device 110 that can communicate with the server 130 to create new tasks. For example, the client device can 110 send tasks to the server 130. In this example, the client device 110 sends task attributes (KINDLE, WIFI, CAMERA) and a task description (TASK 5). The client device 110 can be any type of computing device (e.g., a server computer, desktop computer, laptop, tablet, or another type of computing device) that connects to the server 130 to create new tasks. The server 130 supports communication with any number of client devices (e.g., 110). In addition, the server 130 can communicate with client devices located within the server 130 (e.g., connected by a local or internal network).

The example environment 100 also comprises a consumer device 120 that can communicate with the server 130. For example, the consumer device 120 can send a request for a task and retrieve a task description from the server 130. In this example, the consumer device 120 sends a task request and retrieves a task description (TASK 3). The consumer device 120 can be any type of computing device (e.g., a server computer, desktop computer, laptop, tablet, or another type of computing device) that connects to the server 130 to retrieve tasks. The server 130 supports communication with any number of consumer devices (e.g., 120). In addition, the server 130 can communicate with consumer devices located within the server 130 (e.g., connected by a local or internal network).

Tasks

In any of the embodiments described herein, a task refers to an action to be performed by a consumer device. For example, a task may be a test case. A task may include a task description and one or more task attributes. The task attributes describe the requirements of the task to be matched to a consumer device (i.e., task attributes matching with consumer device configurations). For example, for a task that requires a Kindle, a task attribute may be KINDLE. Alternatively, the task attributes need not to be requirements of the task, and may be any attributes that help identify the task. The task attributes may be hardware configuration attributes, software configuration attributes, or both hardware and software configuration attributes. The task description describes the task to be performed. A task may be created via, e.g., an interface on the client. A developer or another person creating the task can input the task via the interface. Alternatively, a task may be generated by a server or by any other means of generating a task (e.g., auto-generated based on rules for the app or environment).

A task refers to some type of activity to be performed by a consumer device (e.g., to be performed by software, such as an operating system, operating system component, software application or software app, or other software running on the computing device, and/or by the computing device itself such as in hardware or firmware). The task description describes the activity to be performed by the task. The task description may be, e.g., a test script or a test case. For example, if the task is a test case for testing a software application (e.g., a new app to be deployed on an app store) then the task description can describe the software application (e.g., a specific version of the new app, a location where the new specific version of the app can be downloaded, instructions for running the app, etc.). For example, a software developer can create a new version of an app, create a task to test the new version of the app including task attributes that indicate a minimum set of requirements to test the app (e.g., specific model of a computing device and the hardware and/or software components it must have), submit the task to a server environment (e.g., comprising a task data store), and have the server environment distribute the task to one or more consumer devices that have the attributes (consumer attributes) specified by the task. In some embodiments, the developer can receive feedback regarding results of the task being run. For example, the results can indicate that the task was run and the results (e.g., that the task ran successfully, that it crashed, etc.).

Although a task is described as including a task description and one or more task attributes, a task may contain more or less information. For example, a task need not include one or more task attributes. The one or more task attributes may be inferred from a task description. Alternatively, a task need not include a task description. A task may only include one or more task attributes. A task need only provide some manner of obtaining the one or more task attributes.

In some embodiments, only the task attributes comprise the task. This may allow the data store to identify matching consumer devices for the task attributes. For example, the data store stores a task category matching the task attributes. Consumer devices with a consumer category matching the task category identifies itself to the data store. These identified consumer devices can be recorded, e.g., to determine the number of active devices (e.g., as part of a device discovery procedure).

A client device may create a task. For example, if a client needs a task to be performed, the client may create the task on the client device. The client device may provide an interface to input task attributes and task descriptions. Alternatively, the interface may only allow input of either task attributes or task descriptions. The client may also create a task offline and import the task to the client device. The task may be auto-generated based on certain criteria.

The attributes of the task are used to create a task category. A task category describes the task attributes needed to complete the task. A task category may include software attributes and/or hardware attributes. Examples of software attributes include operating system version, application name and application version. Examples of hardware attributes include computing device type, hardware component, hardware specification, hardware capability and hardware version. In some embodiments, the required attributes of the task are included in the task category. For example, for a task requiring a Kindle with Wi-Fi capability and a camera, KINDLE+WIFI+CAMERA may be used as the task category. It should be understood that KINDLE+WIFI+CAMERA is just one example of how a task category can be constructed from task attributes, and the task category can be constructed in other ways that indicate the task attributes that are needed for the task (e.g., by concatenating the task attributes together, such as KINDLE-WIFI-CAMERA, or by associating the task attributes with the task in other ways).

Hereinafter, the terms "task" and "task description" may be used interchangeably. Unless the context clearly indicates otherwise, neither term implies any limitation on the meaning of a task. In general, a task or task description describes the task needed to be performed.

In the foregoing example, KINDLE+WIFI+CAMERA is used as a task category. However, the task category need not necessarily include all of the task attributes in the task category. For example, for a Kindle device using the Kindle operating system, it may be sufficient for KINDLE to be the task category instead of a hardware attribute and software attribute. Further, if all Kindles also includes, e.g., a display, KINDLE may be sufficient for the task category. Similarly, if a task attribute may be used but is not required for the task, that attribute need not be in the task category in order to capture a larger group of consumers, which will be explained further.

Here, the task category is string-based and comprised of the task attributes. However, the task category need not be string-based and comprised of the task attribute. For example, the task category need not be KINDLE+WIFI+CAMERA. Instead the task attributes may be, e.g., a hash value, or any value obtainable from the task attributes.

Figure 2:
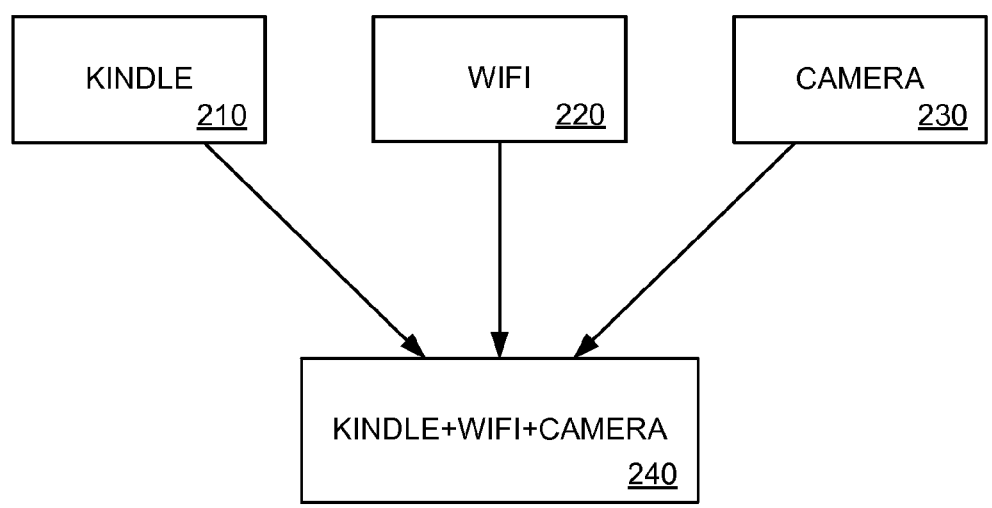
FIG. 2 is a diagram of an example of creating a task or consumer category.

An example for creating a task category will be described with respect to FIG. 2. The attributes of the task may be obtained for the task and the task attributes organized based on a predetermined hierarchy. The hierarchy may be provided by the data store or by some other means. The predetermined hierarchy is used to formulate the task category, where the task attributes in the task category are ordered based on the predetermined hierarchy. For example, if a task requires a Kindle with Wi-Fi capability and camera, the attributes 210, 220 and 230 may be KINDLE, WIFI and CAMERA. If the order of attributes 210, 220 and 230 in the predetermined hierarchy is KINDLE, WIFI, CAMERA, then the task category 240 may be KINDLE+WIFI+CAMERA.

A task category can be represented hierarchically in other ways. For example, a data partition (e.g., also known as a bucket) can be created in the data store that can be independently addressed and contains a set of data objects. Each task category can be stored in a separate partition in the data store. The buckets can be hierarchical. For example, for a Kindle with Wi-Fi capability and camera, KINDLE can be a root bucket, WIFI can be a nested bucket within KINDLE, and CAMERA can be a nested bucket within WIFI. In some embodiments, a nested folder or path structure can be used to represent task categories (e.g., conceptually or as a real structure). For example, a hierarchical structure of example task categories can be represented as:

KINDLE
        WIFI
            CAMERA
        4G
            CAMERA

Consumer Device

In any of the embodiments described herein, a consumer device may retrieve task descriptions from the data store. A consumer device may refer to a computing device on which a task is performed. For example, tasks may be performed by hardware and/or software components of the consumer computing device.

A consumer device may have a set of attributes that are used to describe the consumer device, e.g, the attributes of the consumer device. For example, if a consumer device is a Kindle that has Wi-Fi capability and a camera, KINDLE, WIFI and CAMERA may be used to describe the attributes of the consumer device. The set of attributes is not limited to those described and may comprise additional attributes. For example, a Kindle that has Wi-Fi capability and a camera may also have, e.g., an accelerometer. However, the consumer device need not describe the accelerometer as a consumer attribute.

An example for creating a consumer category will be described with respect to FIG. 2. The attributes of the consumer device may be organized based on a predetermined hierarchy. The hierarchy may be provided by the data store or by some other means. The predetermined hierarchy is used to formulate the consumer category, where the attributes in the consumer category are ordered based on the predetermined hierarchy. For example, if the order of attributes 210, 220 and 230 is KINDLE, WIFI, CAMERA, then a consumer device corresponding to a Kindle with Wi-Fi capability and a camera, may have a consumer category 240 of KINDLE+WIFI+CAMERA. This consumer category is used to retrieve an entry from the data store.

Similar to the task categories, a consumer category is string-based and comprised of the consumer attributes. However, the consumer category need not be string-based and comprised of the consumer attributes. For example, the consumer category need not be KINDLE+WIFI+CAMERA. Instead the consumer attributes may be, e.g., a hash value, or any value obtainable from the consumer attributes. However, the format of the task categories and the consumer categories must be the same.

As with task categories, consumer categories can be represented hierarchically.

Data Store

In any of the embodiments described herein, a task is stored in a data store. The data store may be a NoSQL data store or any other data store using a key-value pair. The key may correspond to the task categories, and the value may correspond to the task descriptions.

A relational database management system (RDBMS) may be used to for task distribution. However, an RDBMS suffers from a number of problems. For example, an RDBMS has a problem with scaling. In order to increase the size of an RDBMS, more servers must be added. As the RDBMS grows in size, it become less efficient. Further, an RDBMS has a problem with unexpected values. All entries in an RDBMS field need to have the same format. Furthermore, a field in an RDBMS cannot simultaneously support multiple data type. For example, a field of the integer data type cannot also contain a string. If the format changes, new tables need to be created, which impact performance of the database.

A NoSQL data store overcomes some of the problems of an RDBMS. However, a NoSQL data store does not allow for query based searches. Thus, a way to efficiently store and retrieve tasks is required in a NoSQL data store is required.

The NoSQL data store may be partitioned based on the keys. For examples, keys with similar values may be partitioned together so that a search for those keys may result in a faster search. This allows the distribution environment to take advantage of a NoSQL data store, while also providing a way to efficiently store and retrieve tasks from the data store. The NoSQL data store may be, e.g., Amazon® DynamoDB®.

Assigning Tasks

Figure 3:
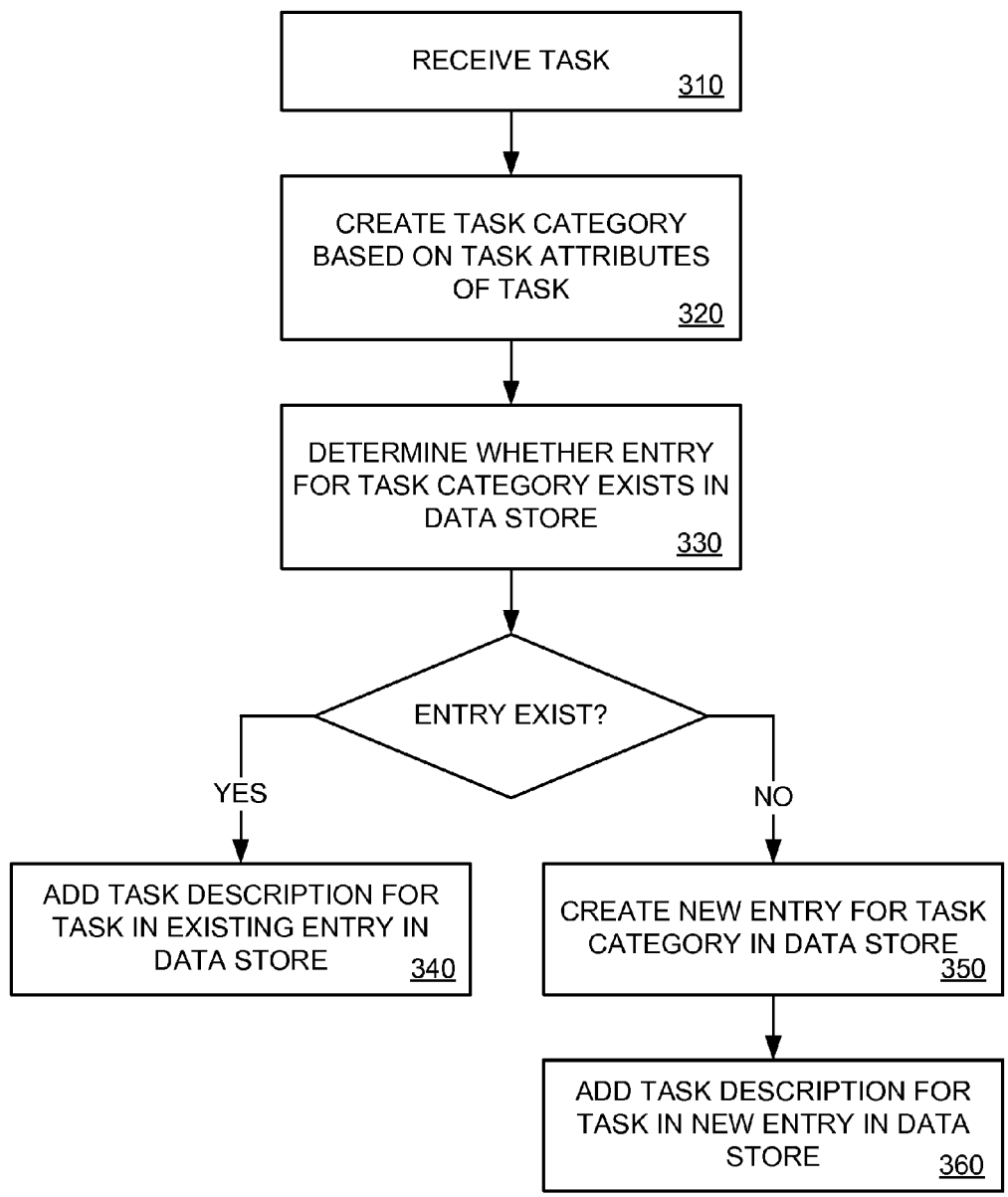
FIG. 3 is a flowchart of an example method for adding new task descriptions to a data store in a distribution environment.

FIG. 3 is a flowchart of an example method for adding new task descriptions to a data store the distribution environment. At 310, a task is received. A client may input a task through, e.g., a client interface. The data store may receive the task as a key-value pair, an unformatted object, or any other format. The task may include one or more task attributes and a task description. The task attributes may be one or both of hardware configuration attributes and software configuration attributes to be matched to a consumer device (i.e., task attributes matching with consumer device configurations).

At 320, a task category is created for the task based on the task attributes of the task. For example, if a task is received as a task category and a task description, a task category may be used as a key and a task description may be used as a value in a key-value pair. If the task is an unformatted object, the task attributes may be determined from the unformatted object and a task category may be created from the determined task attributes. In some embodiments, a task category is created based on the task attributes of the task.

At 330, it is determined whether an entry for the task category exists in a data store. For example, the data store may be searched for an entry that matches the task category. If the task category is used as a key, then an entry with a matching key may be identified.

If a matching entry exists in the data store for the task category, the matching entry may be selected. For example, at 340, if an entry exists for the task category, a task description for the task is added to an existing entry in the data store, i.e., the task description is stored in the identified entry, the entry in the data store being identified by the task category. Thus, a single entry for a task category is stored in the data store, and the entry contains all of the tasks for the task category. In some embodiments, multiple entries may exist for a task category, i.e., the task category may not be a unique key. Thus, a new entry may be created for a new task or added to an existing entry matching the task category.

If a matching entry does exist in the data store for the task category, at 350, a new entry for the task category may be created in the data store. At 360, the task description for the task is added to the new entry (i.e., stored in the new entry) in the data store.

Though this process, the data store can be quickly updated with new entries. For example, the data store can dynamically store new tasks that are created with arbitrary task attributes. For example, a client can create a task that uses a new attribute (e.g., the data store does not have to be pre-configured to know about the new attribute. For example, if a new attribute of "new-attribute" is created, a task category can be generated with the attributes KINDLE+ WIFI+new-attribute), an entry can be created for the task category in the data store, and tasks can be added for the new task category. Thus, the client devices do not care if an entry for a task category presently exists in the data store. The data store will automatically characterize the task (i.e., either in an existing entry or a new entry).

Retrieving Tasks

Figure 4:
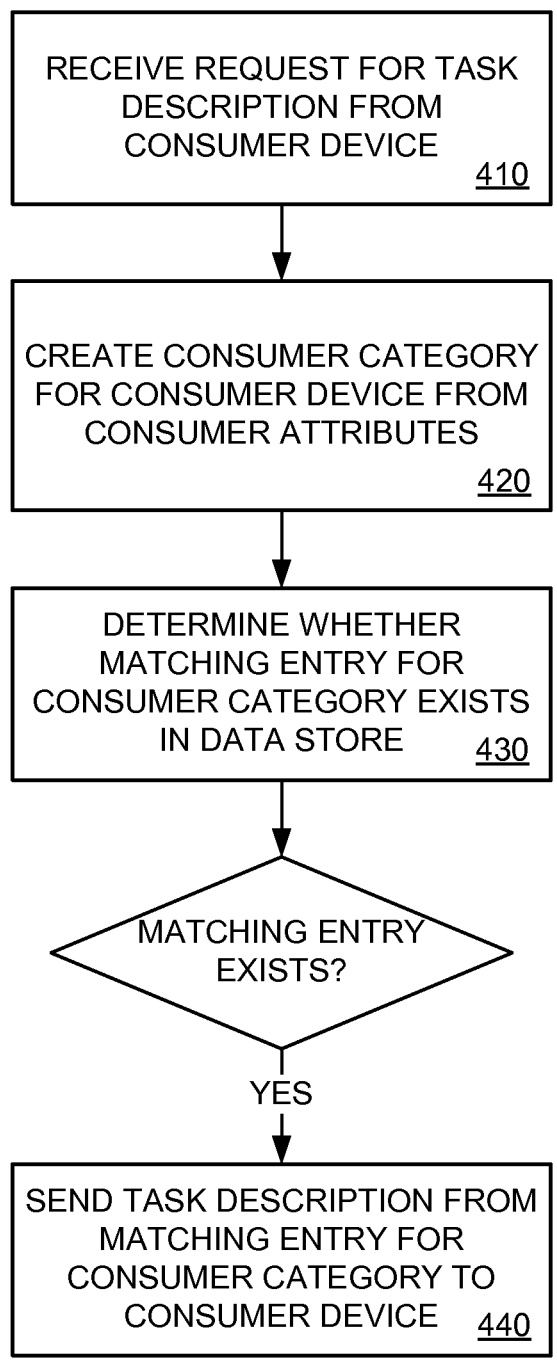
FIG. 4 is a flowchart of an example method for sending a new task description to a consumer device from the data store in the distribution environment.

FIG. 4 is a flowchart of an example method for sending a new task description to a consumer device from the data store in the distribution environment. For example, if a consumer device matches an entry in the data store (i.e., the consumer category matches a task category in the data store), the data store can send a task description to the consumer device.

At 410, a request from a consumer device for a task description is received.

At 420, a consumer category is created for the consumer device based on the consumer attributes of the consumer device. For example, the consumer may send a consumer category based on the consumer attributes of the consumer device. The consumer attributes may be one or both of hardware configuration attributes and software configuration attributes of the consumer device. Alternatively, the consumer device may send a group of consumer attributes from which a consumer category may be created. The consumer category is not limited to the above descriptions and may be obtained in other ways. For example, a list of device types may be stored and a consumer device may identify itself by the device type. The consumer category may be obtained for that device type.

At 430, it is determined whether a matching entry for the consumer category exists in the data store (i.e., the data store is searched for a matching entry in the data store between the consumer category and task categories in the data store). Since the format of a consumer category matches that of a task category, the data store can be searched for an entry with a task category matching the consumer category. For example, a consumer category of "KINDLE+WIFI+CAMERA" can be matched to categories in the data store. If a category of "KINDLE+WIFI+CAMERA" is present in the data store (e.g., if there is an entry for "KINDLE+WIFI+ CAMERA" in the data store), then a match is found.

If a matching entry for the consumer category is found (i.e., an entry exists) in the data store, at 440, the stored task description from the matching entry for the consumer category is sent to the consumer device. However, if no entry matching the consumer category is found, further action may or may not be taken (e.g., the consumer device can be informed that no tasks are available that match the consumer category or matching can be attempted using a different category for a subset of the consumer attributes).

Figure 5:
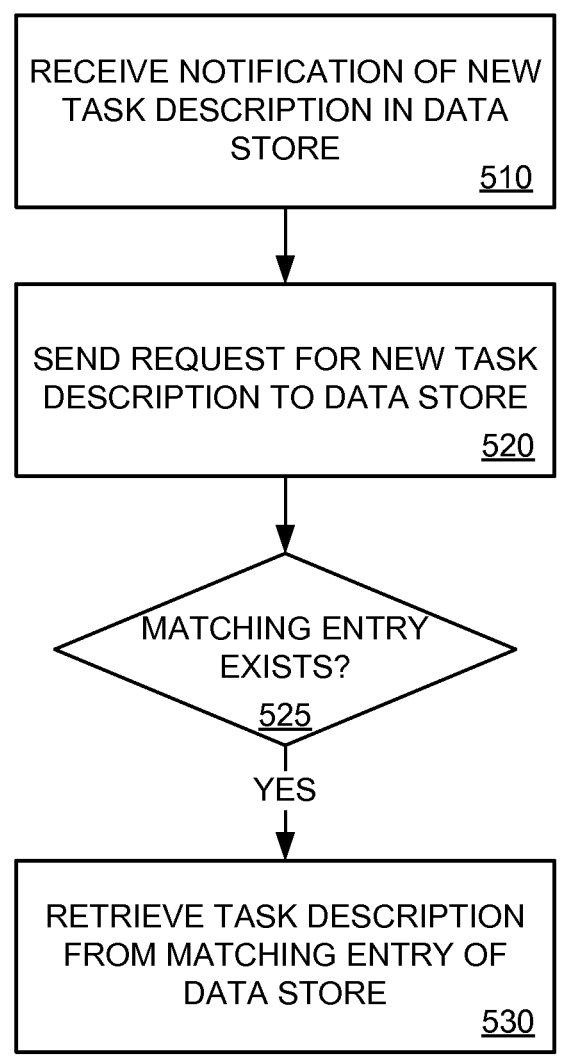
FIG. 5 is a flowchart of an example method for retrieving task descriptions from the data store in the distribution environment.

FIG. 5 is a flowchart of an example method for retrieving task descriptions from the data store in the distribution environment. At 510, a notification is received by a consumer device indicating a new task description in the data store.

At 520, the consumer device sends a request for the new task description to the data store. The request may include a consumer category for the consumer device based on consumer attributes, the consumer attributes being one or both of hardware configuration attributes and software configuration attributes of the consumer device.

At 525, if a matching entry in the data store exists, at 525, the consumer device retrieves the task description from the matching entry of the data store. If a matching entry in the data store does not exist (e.g, another consumer device has already retrieved the task description), no further action need to be taken.

In some embodiments, if a task description is sent to the consumer device, the task description may be subsequently removed from the data store. However, the task description does not necessarily need to be removed from the data store. The task description may be placed in a flagged state or moved to another entry indicating that the task description is being performed. Or, in some situations, a task description may be sent multiple times (e.g., to multiple consumer devices).

Figure 6:
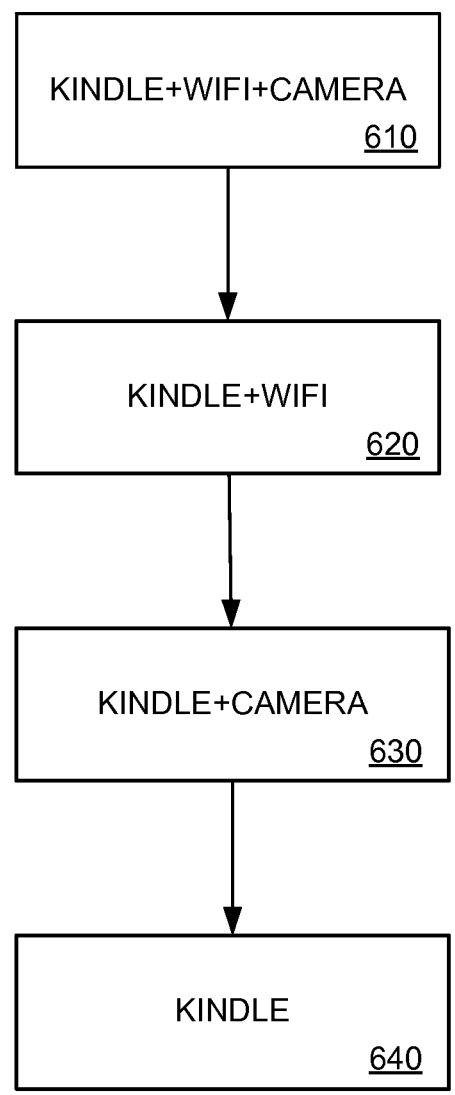
FIG. 6 is a diagram of an example of creating additional consumer categories from a set of consumer attributes.

If a matching entry in the data store does not exist for a consumer category, the data store may be searched for additional consumer categories for the consumer device. For example, FIG. 6 is a diagram of an example of creating additional consumer categories from a set of consumer attributes. As shown in FIG. 6, a consumer device may have a consumer category 610 of KINDLE+WIFI+CAMERA. This corresponds to a Kindle with Wi-Fi capability and a camera, i.e., a consumer device with the attributes KINDLE, WIFI and CAMERA. If an entry does not exist in the data store for the consumer category 610, another consumer category may be created based on a subset of the consumer attributes. For example, if an entry for KINDLE+WIFI+CAMERA does not exist in the data store, KINDLE+WIFI may be used as another consumer category 620. If an entry for KINDLE+WIFI exists in the data store, a task description from the entry for KINDLE+WIFI in the data store is sent to the consumer device. If an entry for KINDLE+WIFI does not exist in the data store, KINDLE+CAMERA may be used (630). If an entry for KINDLE+CAMERA does not exist in the data store, KINDLE may be used as the consumer category 640. In other words, the data store can be searched for an entry with a task category matching a subset of the consumer category.

In some embodiments, the consumer device may receive task descriptions automatically. The data store may be aware of the consumer attributes of consumer device and may send task descriptions matching the consumer attributes as new task descriptions are received by the data store. The data store may also send a notification of a new task description to the consumer devices. If a consumer category of a consumer device matches an entry in the data store for the task category for the new task description, the consumer device may retrieve the task description. In some embodiments, a consumer device may poll the data store for a task description at certain intervals. If an entry in the data store matches the consumer category for the consumer device at the time of polling, a task description from the matching entry may be sent to the consumer device.

In some embodiments, once a task description is from an entry is sent to the consumer device, the task description may be removed from the entry in the data store. Alternatively, the data store may flag the task description until an indication of its completion has been received. In some embodiments, a task description may be retrieved by only one consumer device. However, the data store can create multiple copies of a task description. Alternatively, the task description may have a counter and may send as many task descriptions as allowed by the counter.

Detailed Examples of Adding and Retrieving Task Descriptions

Figure 7:
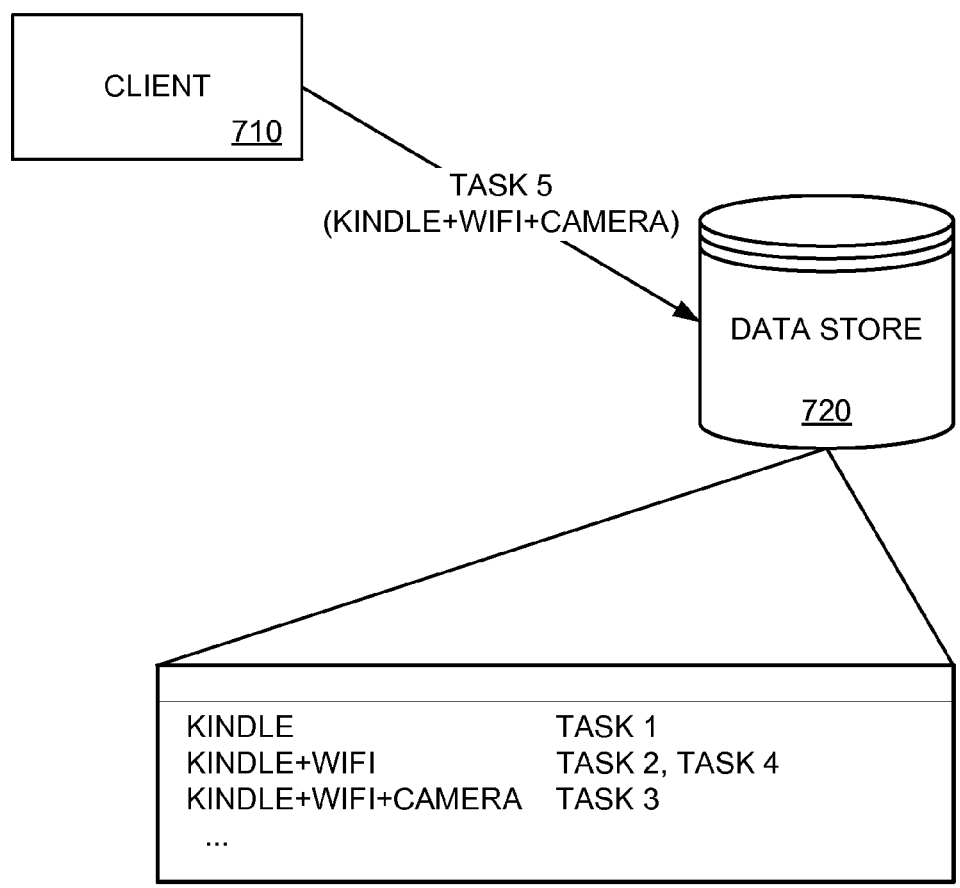
FIG. 7 is a diagram of an example of adding a task description to the data store with an existing entry in the data store.

FIG. 7 is a diagram of an example of adding a task description in the data store with an existing entry in the data store. As shown in FIG. 7, client 710 is sending a new task description to the data store 720. The task description (task 5) requires a Kindle with Wi-Fi capability and a camera. A task category KINDLE+WIFI+CAMERA is also obtained. For example, the task category KINDLE+WIFI+CAMERA can be created from the task attributes KINDLE, WIFI and CAMERA. Next, the data store 720 is searched for an entry matching the task category KINDLE+WIFI+CAMERA. Here, an entry for KINDLE+WIFI+CAMERA is found in the data store 720 (with an existing task description for task 3). Task 5 is added to this entry, so the entry would appear as "KINDLE+WIFI+CAMERA: TASK 3, TASK 5" in the data store 720.

Figure 8:
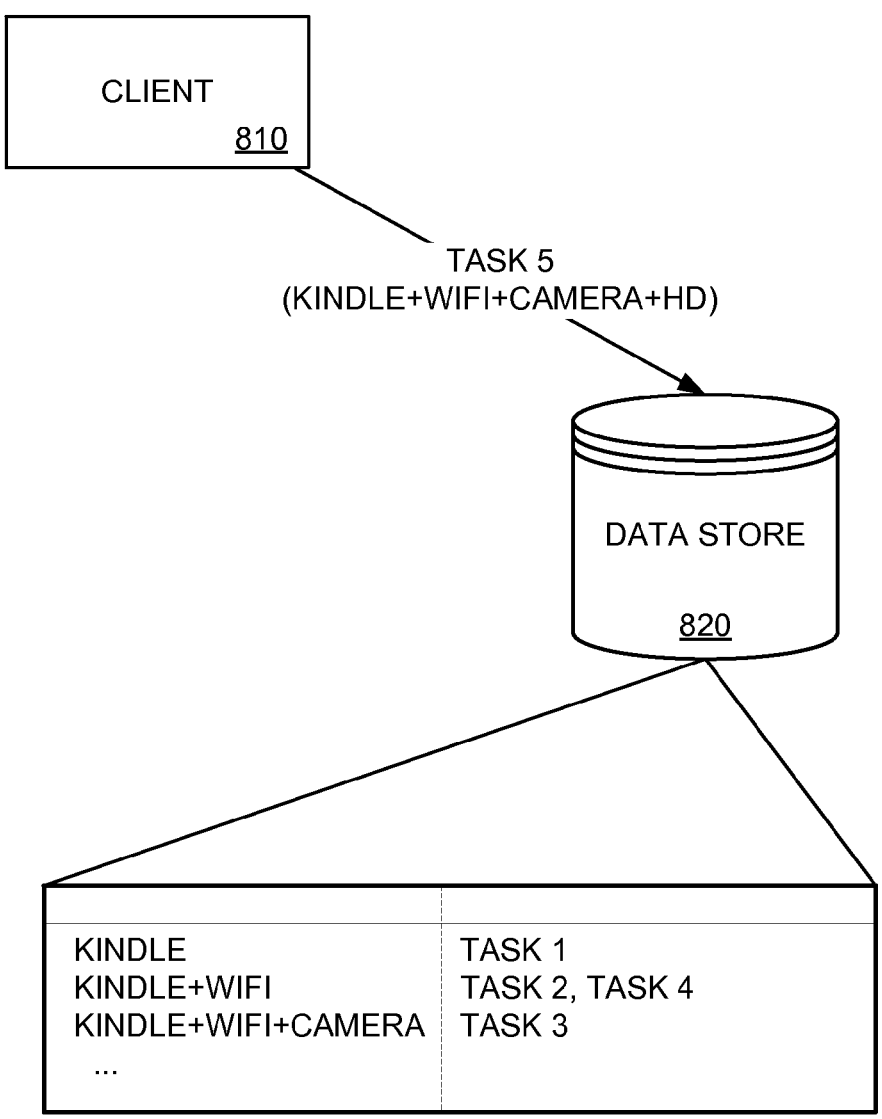
FIG. 8 is a diagram of an example of adding a task description to the data store where an existing entry does not exist in the data store.

FIG. 8 is a diagram of an example of adding a task description to the data store where an existing entry in the data store does not exist. As shown in FIG. 8, client 810 is sending a new task description to the data store 820. The task description (task 5) requires a Kindle with Wi-Fi and High Definition (HD) capability and a camera. A task category KINDLE+WIFI+CAMERA+HD is also obtain. Next, the data store 820 is searched for an entry matching the task category KINDLE+WIFI+CAMERA+HD. Here, an entry for KINDLE+WIFI+CAMERA+HD is not found in the data store 820. Thus, for task 5, a new entry is created in the data store 820 with KINDLE+WIFI+CAMERA+HD as the key. Task 5 is added to this newly created entry, so the entry would appear as "KINDLE+WIFI+CAMERA+HD: TASK 5" in the data store 820.

Figure 9:
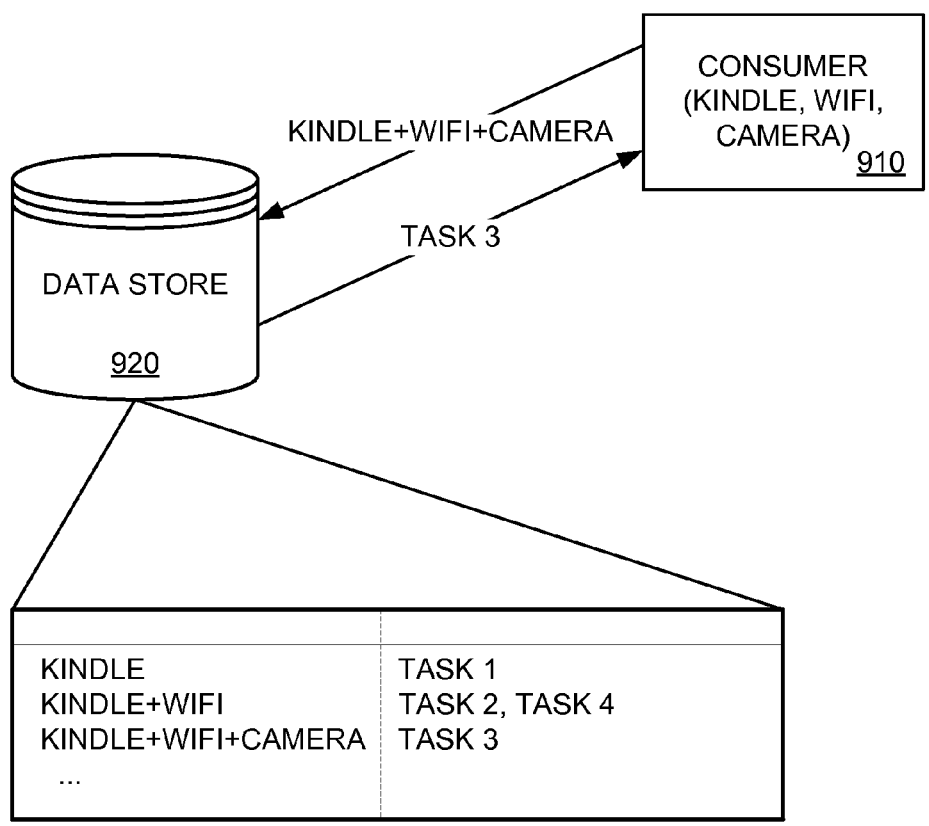
FIG. 9 is a diagram of an example of retrieving a task description from an existing entry in the data store.

FIG. 9 is a diagram of an example of retrieving a task description from an existing entry in the data store. As shown in FIG. 9, consumer device 910 has the attributes of a Kindle with Wi-Fi capability and a camera. From the consumer device 910, the consumer category KINDLE+WIFI+CAMERA is obtained. The data store 920 is searched for an entry matching KINDLE+WIFI+CAMERA. Here, an entry for KINDLE+WIFI+CAMERA is found with a task description (task 3). Thus, task 3 is sent to the consumer device 910.

Figure 10:
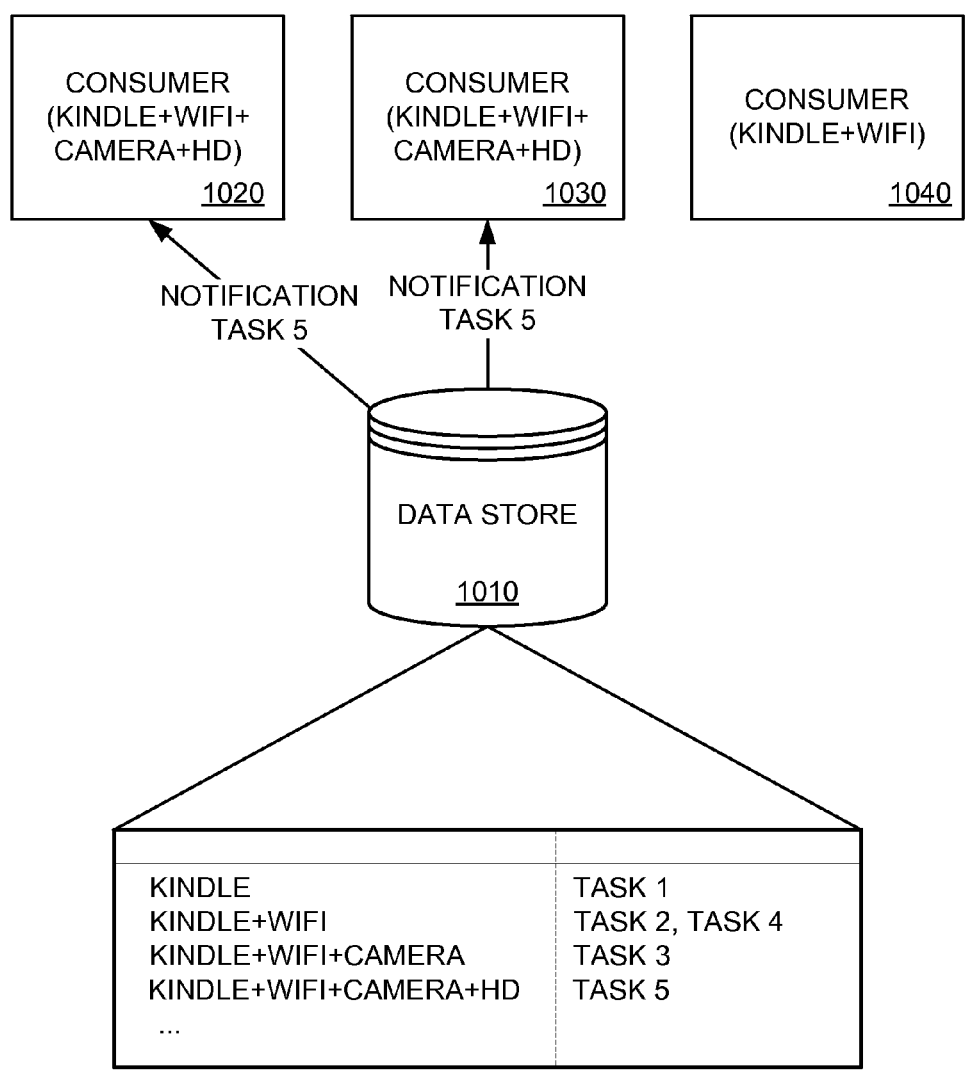
FIG. 10 is a diagram of an example of sending a notification of a new task description in the data store to consumer devices.

FIG. 10 is a diagram of an example of sending a notification of a new task description in the data store to consumer devices. As shown in FIG. 10, a new task description (task 5) is found in the data store 1010. The task description has a corresponding task category of KINDLE+WIFI+CAMERA+HD. Here, a notification is sent to those consumer devices that have a consumer category of KINDLE+WIFI+CAMERA+HD (1020, 1030). For those devices that do not have the consumer attributes of KINDLE+WIFI+CAMERA+HD, no notification is sent. For example, if a consumer device has consumer attributes of only a Kindle with Wi-Fi capability, not notification is sent to that consumer device. Alternatively, a notification of a new task description is sent to all consumer devices. However, only those consumer devices with the consumer category KINDLE+WIFI+CAMERA+HD may retrieve the new task description.

Example Computing Systems

Figure 11:
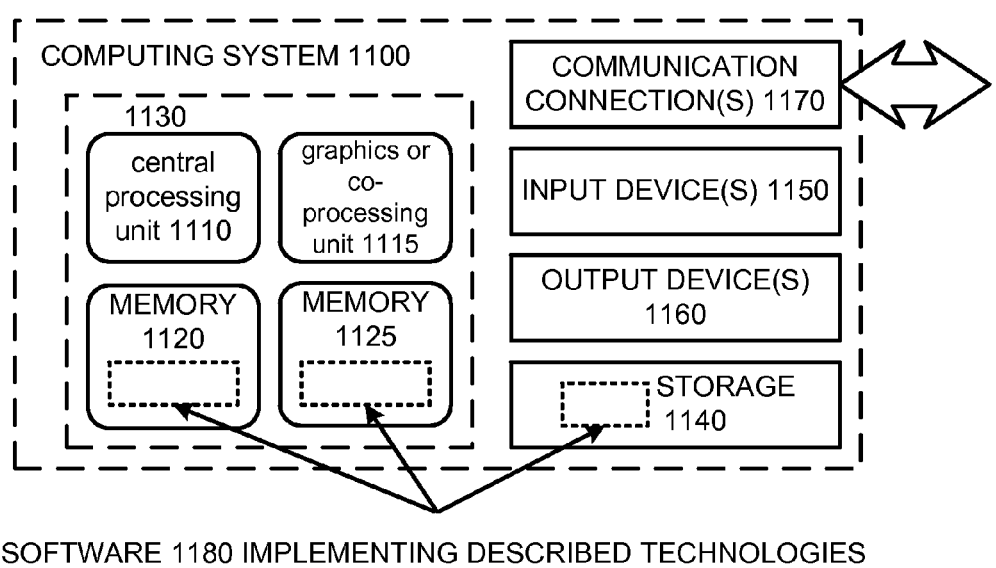
FIG. 11 depicts a generalized example of a suitable computing environment in which the described innovations may be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160 and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Cloud Computing Environment

Figure 12:
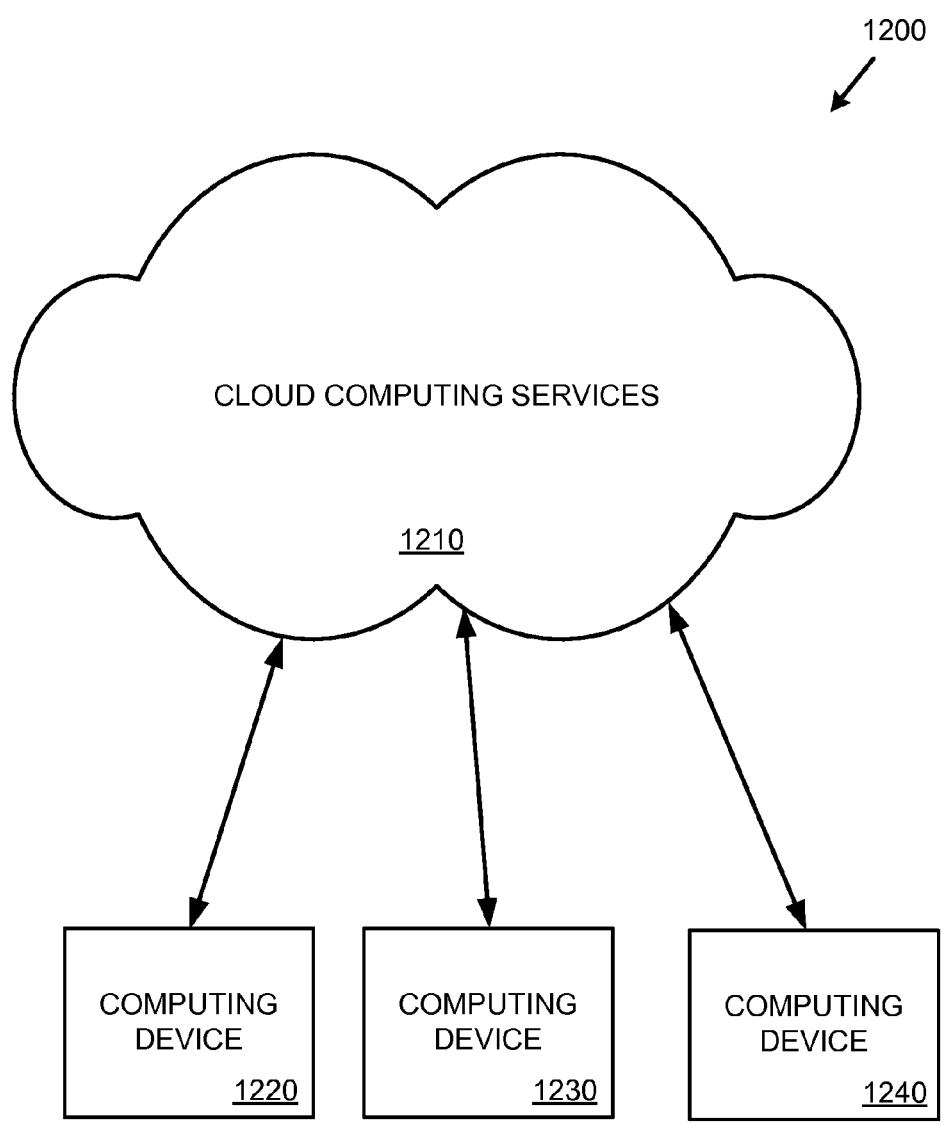
FIG. 12 depicts an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1230 and 1240. For example, the computing devices (e.g., 1220, 1230 and 1240) can be computers (e.g., desktop or laptop computers), mobile devices (e.g., tablet computers or smart phones), or other types of computing devices. For example, the computing devices (e.g., 1220, 1230 and 1240) can utilize the cloud computing services 1210 to perform computing operators (e.g., data processing, data storage, and the like).

For example, the cloud computing services 1210 can comprise a storage service for storing entries which can be accessed by the computing devices (e.g., 1220, 1230 and 1240). For example, one or more of the computing devices (1220, 1230 and 1240) can send new task descriptions to be stored by the storage service. Further, one or more of the computing devices (1220, 1230 and 1240) can retrieve task descriptions from the storage service.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., non-transitory computer-readable media, such as one or more optical media discs such as DVD or CD, volatile memory components (such as DRAM or SRAM), or non-volatile memory components (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, e.g., a dedicated software application or a software application that is accessed or downloaded via a web browser or other software application (such as a remote computing application). Such software can be executed, e.g, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, e.g., computer-executable instructions for causing a computer to perform any of the disclosed methods) can be uploaded, downloaded, or remotely accessed through a suitable communication means. Such suitable communication means include, e.g., the Internet, the World Wide Web, an intranet, software applications, cable (including fiber optic cable), magnetic communications, electromagnetic communications (including RF, microwave and infrared communications), electronic communications, or other such communication means.

The disclosed methods, apparatus and systems should not be construed as limiting in any way. Instead, the present disclosure is directed toward all novel and nonobvious features and aspects of the various disclosed embodiments, alone and in various combinations and sub combinations with one another. The disclosed methods, apparatus and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

What is claimed is:

1. A method, implemented at least in part by a computing device, of distributing tasks over a heterogeneous system using task and consumer categories, the method comprising:
   receiving a task, the task comprising at least one or more task attributes and a task description, wherein the one or more task attributes are one or both of hardware configuration attributes and software configuration attributes for matching with consumer device configurations;
   creating a task category for the task based on the one or more task attributes;
   determining whether an entry for the task category exists in a data store, the entry being identified using the task category;
   when an entry for the task category exists in the data store, storing the task description in the identified entry in the data store;
   when an entry for the task category does not exist in the data store, creating a new entry in the data store for the task category based on the one or more task attributes, wherein the one or more task attributes are one or both of hardware configuration attributes and software configuration attributes for matching with consumer device configurations, the task description being stored in the new entry for the task category in the data store;
   receiving a task request from a consumer device;
   creating a consumer category for the consumer device based on consumer attributes, wherein the consumer attributes are one or both of hardware configuration attributes and software configuration attributes of the consumer device;
   searching for a matching entry in the data store between the consumer category and task categories in the data store; and
   when a matching entry for the consumer category is found in the data store, sending a stored task description from the matching entry to the consumer device.

2. The method of claim 1, wherein the task description is a test case for testing a software application.

3. The method of claim 1, further comprising sending a notification of a new task description to the consumer device.

4. The method of claim 1, wherein the data store is a key-value data store, wherein keys correspond to task categories, and wherein values correspond to task descriptions, the data store being partitioned based on the keys.

5. A computer server environment for storing tasks using task and consumer categories, the computer server environment comprising:
   one or more server systems comprising processing units and memory; and
   a data store;
   the one or more server systems configured to perform a method comprising:
   receiving a task;
   creating a task category based on task attributes of the task, wherein the task attributes are one or both of hardware configuration attributes and software configuration attributes to be matched with consumer device configurations;
   determining whether an entry for the task category exists in the data store;

when an entry for the task category exists in the data store, adding a task description for the task to the existing entry in the data store; and when an entry for the task category does not exist in the data store:

creating a new entry in the data store for the task category based on the task attributes of the task, wherein the task attributes are one or both of hardware configuration attributes and software configuration attributes to be matched with consumer device configurations, and adding a task description for the task to the new entry for the task category in the data store.

6. The computer server environment of claim 5, wherein the task category is string-based.

7. The computer server environment of claim 6, wherein the task attributes of the task are ordered in the task category based on a predetermined hierarchy of the task attributes.

8. The computer server environment of claim 5, wherein the task attributes comprise at least one of:
an application name;
a computing device type;
a hardware component;
a hardware specification; and
a hardware capability.

9. The computer server environment of claim 5, wherein the data store is a key-value data store, wherein keys correspond to task categories, and wherein values correspond to task descriptions, the data store being partitioned based on the keys.

10. The computer server environment of claim 5, wherein each task category is stored in a separate partition in the data store.

11. The computer server environment of claim 5, wherein the method further comprises:
receiving a request for a task description from the consumer device;
creating a consumer category for the consumer device from consumer attributes, wherein the consumer attributes are one or both of hardware configuration attributes and software configuration attributes of the consumer device;
determining whether a matching entry for the consumer category exists in the data store, the determining comprising matching the consumer category with a task category stored in the data store; and
when a matching entry for the consumer category exists in the data store, sending a task description from the matching entry for the consumer category to the consumer device.

12. The computer server environment of claim 11, wherein the consumer attributes of the consumer device are ordered in the consumer category based on a predetermined hierarchy of the consumer attributes.

13. The computer server environment of claim 11, wherein the method further comprises:
upon sending the task description from the matching entry for the consumer category to the consumer device, removing the task description from the matching entry for the consumer category in the data store.

14. The computer server environment of claim 11, wherein the method further comprises:
when a matching entry for the consumer category does not exist in the data store:
creating a second consumer category from the consumer attributes of the consumer device, wherein the second consumer category comprises a subset of the consumer attributes;
determining if a matching entry for the second consumer category exists in the data store; and
when a matching entry for the second consumer category exists in the data store, sending a task description from the matching entry for the second consumer category to the consumer device.

15. The computer server environment of claim 5, further comprising sending a notification of the task description to the consumer device.

16. A non-transitory computer-readable storage medium storing computer-executable instructions for performing a method for receiving tasks using task and consumer categories, the method comprising:
receiving a task;
creating a task category based on task attributes of the task, wherein the task attributes are one or both of hardware configuration attributes and software configuration attributes to be matched with consumer device configurations;
determining whether an entry for the task category exists in the data store;
when an entry for the task category exists in the data store, adding a task description for the task to the existing entry in the data store; and
when an entry for the task category does not exist in the data store:
creating a new entry in the data store for the task category based on the task attributes of the task, wherein the task attributes are one or both of hardware configuration attributes and software configuration attributes to be matched with consumer device configurations
adding a task description for the task to the new entry for the task category in the data store;
sending a notification of the new task description in the data store to a consumer device;
receiving a request for the new task description from the consumer device, the request comprising a consumer category for the consumer device based on consumer attributes, wherein the consumer attributes are one or both of hardware configuration attributes and software configuration attributes of the consumer device; and
when a matching entry for the consumer category exists in the data store, retrieving a task description from the matching entry of the data store.

17. The computer-readable storage medium of claim 16, wherein the consumer attributes are ordered in the consumer category based on a predetermined hierarchy of the consumer attributes.

18. The computer-readable storage medium of claim 16, the method further comprising:
polling the data store for an existing task description in an entry matching the consumer category; and
retrieving the existing task description.

19. The computer-readable storage medium of claim 16, wherein the matching entry indicates an entry in the data store wherein a task category of the entry matches the consumer category.

20. The computer-readable storage medium of claim 16, wherein the matching entry indicates an entry in the data store wherein a task category of the entry matches a subset of the consumer category.

* * * * *